United States Patent [19]

Maxson

[11] Patent Number: 4,709,001

[45] Date of Patent: Nov. 24, 1987

[54] IN SITU LOW TEMPERATURE SILOXANE GEL

[75] Inventor: Myron T. Maxson, Midland, Mich.

[73] Assignee: Dow Corning Corporation, Midland, Mich.

[21] Appl. No.: 290

[22] Filed: Jan. 2, 1987

[51] Int. Cl.$^4$ ............................................. C08G 77/06
[52] U.S. Cl. ........................................ 528/15; 528/31; 528/32; 528/901; 525/478; 525/479
[58] Field of Search ............... 528/15, 31, 32, 901; 525/478, 479

[56] References Cited

U.S. PATENT DOCUMENTS

| | | | |
|---|---|---|---|
| 3,020,260 | 2/1962 | Nelson | 260/46.5 |
| 3,361,714 | 1/1968 | Omietanski | 260/46.5 |
| 3,436,366 | 4/1969 | Modic | 260/37 |
| 4,374,967 | 2/1983 | Brown et al. | 528/15 |
| 4,613,659 | 9/1986 | Lee et al. | 528/15 |

Primary Examiner—Melvyn I. Marquis
Attorney, Agent, or Firm—Roger H. Borrousch

[57] ABSTRACT

Siloxane gels which exhibit low temperature properties are obtained without the preparation of special polymers. The compositions form the low temperature branching in situ by mixing polydiorganosiloxane having dimethylsiloxane units and methylvinylsiloxane units with a methylhydrogensiloxane crosslinking mixture of monofunctional methylhydrogensiloxane and difunctional methylhydrogensiloxane in the presence of an addition reaction catalyst. The viscosity and the low temperature properties can be controlled.

18 Claims, No Drawings

IN SITU LOW TEMPERATURE SILOXANE GEL

BACKGROUND OF THE INVENTION

1. Field of the Invention

This invention relates to methylsiloxane compositions which cure to gels exhibiting low temperature properties. More specifically, this invention relates to compositions which are prepared in situ.

2. Background Information

The principal use intended for the gels formulated according to the present invention is as a dielectric potting gel. The use of silicone potting compounds to encapsulate electrical assemblies is well documented. U.S. Pat. No. 3,436,366 issued Apr. 1, 1969, to Modic describes how silicone materials are used to provide electrical insulation and various degrees of protection from thermal and mechanical abuse. The Modic patent also describes the possibility of formulating a dielectric potting compound using a polyorganosiloxane having only methyl and vinyl substituents. However, those substituents are arranged in such a way so as to promote a great deal of crosslinking resulting in significant tear strength. In particular, Modic teaches using an organopolysiloxane having methylvinylsiloxane and $SiO_2$ units. Both of those units promote a high degree of crosslinking resulting in a product having very little in common with the supple gel of the present invention. Furthermore, the Modic material does not have the unique low temperature property exhibited by the gels of the present invention.

U.S. Pat. No. 3,020,260, issued Feb. 6, 1962, to Nelson is perhaps more relevant to the present invention. In Example 10 of that reference a silicone gel formulated from siloxane copolymers having only methyl and vinyl substituents is described.

More precisely, the Nelson patent teaches a method of formulating a silicone potting gel by reacting a blend of 86.95 parts by weight of copolymer (I) consisting of $Me_2SiO$, $MeViSiO$, and $Me_3SiO_{0.5}$ and 8.27 parts by weight of copolymer (II) consisting of $Me_2SiO$, $MeSiO_{1.5}$, and $Me_3SiO_{0.5}$ with 4.78 parts by weight of an organohydrogensiloxane crosslinker in the presence of a platinum catalyst. The organohydrogensiloxane crosslinker described by Nelson has a formula $Me_2HSiO(Me_2SiO)_nSiMe_2H$, a viscosity of 62 centistokes at 25° C. and contains 0.113 percent silicon-bonded hydrogen. The symbol "Me" represents a "—CH3" radical and the symbol "Vi" represents a "—CH=CH2" radical.

The silicone potting gel resulting from the Nelson formulation will form a dielectric silicone gel, but because of the ratios of the units employed and the presence of a unit having an internal vinyl function (MeViSiO), it will not have the structural properties and, hence, will not have the low temperature stability of the siloxane gel prepared according to the present invention.

Omietanski in U.S. Pat. No. 3,361,714 issued Jan. 2, 1968 discloses certain "Comb" polymers and "Star" polymers having low temperature properties. These polymers are non-random polymers and have a generic formula

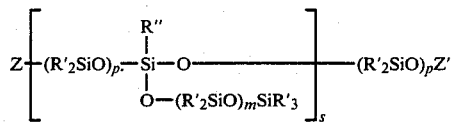

wherein R' is a monovalent hydrocarbyl radical, R" is a monovalent hydrocarbyl radical or substituted monovalent hydrocarbyl radical, p is 0 to 25, m is 1 to 21, s is greater than zero. Z' is hydrogen or $R'_3Si$—, and Z is hydroxyl or $R'_3SiO$—. Omietanski teaches that fluids and elastomers cured with organic peroxides can be obtained which exhibit low temperature properties.

Mindful of the properties and limitations of the silicone potting compounds known and described in the prior art, we endeavored to formulate a siloxane gel from a siloxane polymer having only methyl and vinyl substituents. However, these well-known units have been combined in such a manner so as to provide a novel polymeric composition which will cure rapidly to a gel at ambient or elevated temperatures and maintain its gel properties at very low temperatures. Brown et al in U.S. Pat. No. 4,374,967, issued Feb. 22, 1983, described such compositions. Brown et al describe compositions made by using a special vinyl containing polyorganosiloxane which contains dimethylsiloxane units, methylsilsesquioxane units. trimethylsiloxy units, and monovinyldimethylsiloxy units which cure to a gel which has low temperature properties, such as —120° C. Brown et al prefers to crosslink the gel with a polyorganosiloxane which has two silicon-bonded hydrogens per molecule, and these hydrogen atoms are preferably on the ends of the linear polymer. Brown et al teach that, if low temperature properties are to be obtained. the special vinyl containing siloxane polymers must be used.

Lee et al in U.S. Pat. No. 4,613,659, issued Sept. 23, 1986, teach that low temperature properties can be obtained in silicone gels which are made using special siloxane polymers which contain silicon-bonded hydrogen atoms. The polymers taught by Lee et al contain dimethylsiloxane units. methylsilsesquioxane units monohydrogendimethylsiloxy units and trimethylsiloxy units.

The special polymers of Brown et al and Lee et al must be carefully prepared. The viscosity of these polysiloxanes is controlled by the ratio of the trimethylsiloxy. dimethylvinylsiloxy. or dimethylhydrogensiloxy units to the dimethylsiloxane units and the small amount of methylsilsesquioxane units present. The preparation of such polymers must be carefully done to prevent gelling during the preparation and to obtain the desired low temperature property. For example, a desirable low temperature property is obtained by polysiloxanes having at least 3 mole percent monomethylsilsesquioxane units and to prevent gelling during the preparation at least 3 mole percent trimethylsiloxy, dimethylvinylsiloxy, or a mixture of both is needed. The result is that the maximum viscosity which can be made is about 2 Pa.s. The characteristics of these gels are set when the polysiloxane is made, with respect to low temperature properties, viscosity, and many of the gel properties.

SUMMARY OF THE INVENTION

An object of the present invention is to provide gel compositions with low temperature properties, control of the low temperature properties, a broad useful viscosity range, and variability of the gel properties without changing the low temperature properties.

This invention relates to a composition which cures to a gel exhibiting low temperature properties comprising the product obtained by mixing (A) a polydiorganosiloxane having the general formula

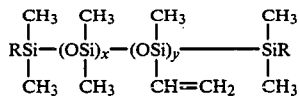

in which R is methy or vinyl, x has a value of from 50 to 1,000. and y has a value of from $0.04(x+y)$ to $0.28(x+y)$, where $x+y$ equals 100 mole percent, (B) an methylhydrogensiloxane crosslingking mixture consisting of (1) a monofunctional methylhydrogensiloxane selected from the group consisting of

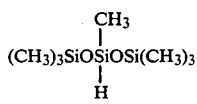

and

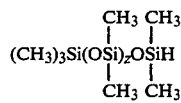

in which z has a value of from 0 to 30, and (2) a difunctional methylhydrogensiloxane selected from the group consisting of

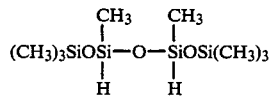

and

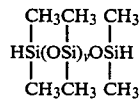

in which v has a value of from 0 to 30, and (C) an addition reaction catalyst.

DESCRIPTION OF THE PREFERRED EMBODIMENTS

The present invention provides a way of obtaining gels with low temperature properties without the preparation of special polymers having low temperature properties per se. The compositions of the present invention obtain the low temperature properties by in situ formation of polymer branching which gives the low temperature property. The siloxane gels of the present invention are obtained by mixing a vinyl containing polydiorganosiloxane having between about 4 to 28 mole percent vinyl radical with the remainder being methyl radical. By combining such linear polydiorganosiloxanes with a crosslinking mixture of methylhydrogensiloxanes having monofunctional polysiloxane species and difunctional polysiloxane species in the presence of an addition reaction catalyst. The monofunctional methylhydrogensiloxane provides a nonfunctional branch and the low temperature properties and the difunctional methylhydrogensiloxane provides the crosslinking. The softness of the gel is controlled by the ratio of the monofunctional methylhydrogensiloxane to difunctional methylhydrogensiloxane. When the mole ratio of silicon-bonded hydrogen atoms to silicon-bonded vinyl radical is close to 1:1 the proper number of branches are obtained. The ratio of silicon-bonded hydrogen to silicon-bonded vinyl can vary broadly, but preferably is from 0.4/1 to 1.5/1, with the most preferred from 0.6/1 to 1.2/1. This ratio can also be used to futher control the softness of the gel.

The polydiorganosiloxane, (A), is a linear polymer which has methyl and vinyl radicals and the general formula

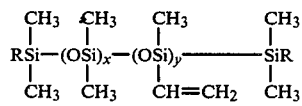

in which R is methyl or vinyl, x has a value of from 50 to 1,000, and y has a value of from $0.04(x+y)$ to $0.28(x+y)$, and where $x+y$ equals 100 mole percent. The polydiorganosiloxane preferably has more than three vinyl radicals per molecule with y having a value of $0.10(x+y)$ to $0.28(x+y)$. Gels which are tougher can be obtained from polydiorganosiloxanes which have values of x and Y such that the viscosity at 25° C. is in the range of 50 to 100 Pa.s. It is also preferred that low molecular weight polydiorganosiloxanes have dimethylvinylsiloxy endblocking.

The methylhydrogensiloxane crosslinking mixture, (B) contains monofunctional methylhydrogensiloxane, (1), and difunctional methylhydrogensiloxane, (2), in a weight ratio such that the crystallization point is reduced compared to compositions without the presence of monofunctional methylhydrogensiloxane where such comparisons use the same polydiorganosiloxane, (A). The ratio of monofunctional methylhydrogensiloxane to difunctional methylhydrogensiloxane is preferably such that the SiH from (1) to the SiH from (2) is in a ratio of 2:1 to 25:1, more preferably from 2.5:1 to 10:1. The monofunctional methylhydrogensiloxane (1) can be the methylhydrogensiloxane of the formula

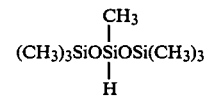

or a methylhydrogensiloxane of the general formula

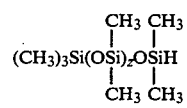

in which z has a value of from 0 to 30, preferably from 0 to 10.

The difunctional methylhydrogensiloxane (2) can be the methylhydrogensiloxane of the formula.

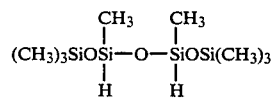

or a methylhydrogensiloxane of the general formula

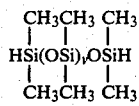

in which v has a value W of from 0 to 30, preferably from 0 to 10.

The addition reaction catalyst, (C), is a hydrosilation catalyst and can be any of those catalysts known to catalyze the addition of silicon-bonded hydrogen atoms to silicon-bonded vinyl radicals. Such catalysts include platinum, the preferred type of hydrosilation catalyst, rhodium, and other platinum metal catalyst. These catalysts include the metals in finely divided form, compounds of these metals, salts of these metals, and complexes of these metals. The preferred catalysts are those which are compatible with the siloxane ingredients of the composition because compatible catalysts are more readily dispersed in the composition and therefor provide a even reaction throughout the composition mixture, also because compatible catalysts provide clear cured products. Some cases where this feature is an advantage, include being able to see the electrical components through the cured silicone potting gel, thus allowing the defective component to be easily found and repaired without having to remove all of the potting gel.

Platinum catalysts include chloroplatinic acid and its hexahydrate as described in U.S. Pat. No. 2,823,218, issued Feb. 11, 1958 to Speier et al., the reaction products of chloroplatinic acid with vinyl endblocked polysiloxane fluids such a sym-divinyltetramethyldisiloxane as described by Willing in U.S. Pat. No. 3,419,593 issued Dec. 31, 1968, the alkene complexes described by Ashby in U.S. Pat. No. 3,159,601, issued Dec. 1, 1964, and in U.S. Pat. No. 3,159,662, issued Dec. 1, 1964, the platinum acetylacetonate described by Baney in U.S. Pat. No. 3,723,497, issued Mar. 27, 1973, the platinum alcoholates described by Lamoreaux in U.S. Pat. No. 3,220,972, issued Nov. 30, 1965, and in many more patents which describe other types of platinum catalysts and other types of hydrosilation catalysts. The foregoing patents describing platinum catalyst are hereby incorporated by reference to show the various type of platinum catalyst. The preferred catalyst are those described by Willing.

In using the hydrosilation catalyst in which the metal is platinum, the composition may begin to cure immediately when the SiH methylhydrogensiloxane crosslinking mixture, the vinyl containing polydiorganosiloxane, and the platinum catalyst are mixed. Those compositions which are not intended to be cured immediately, should contain a platinum catalyst inhibitor which retards the addition reaction at room temperature and in some situations up to 50° or 70° C. In those instances in which all the ingredients are packaged in one container, stored, shipped, and then cured at a later date, a platinum catalyst inhibitor should be used. In those instances in which the ingredients are mixed shortly before the cure is desired and where an extended pot life is desired to provide, such as, for the preparation of enough material for a working day, the compositions should also contain a platinum catalyst inhibitor.

There are many platinum catalyst inhibitors known. Each of these inhibitors have special characteristics which may make them suitable for certain applications. However, this invention does not deal with special characteristics of the platinum catalyst inhibitors, but is directed to the novel combination of polydiorganosiloxane containing methyl and vinyl radicals in which the vinyl is in a concentration of 4 to 28 mole percent and a methylhydrogensiloxane crosslinking mixture of monofunctional methylhydrogensiloxane and difunctional methylhydrogensiloxane. Some of the platinum catalyst inhibitors which are well known in the art include, benzotriazole as described in U.S. Pat. No. 3,192,181, issued June 29, 1965; the acetylenic compounds described in U.S. Pat. No. 3,445,420, issued May 20, 1969; the aromatic heterocyclic nitrogen compounds, pyridazine. pyrazine, quinoline, 2,2'-biquinoline, bipyridine, naphthyridine, quinaldine, dialkyl formamides, thioamides, alkylthioureas, and ethylene thiourea described in U.S. Pat. No. 3,188,299, issued June 8, 1965; the organophosphorus compounds as described in U.S. Pat. No. 3,188,300, issued June 8, 1965; the nitrile compounds as described in U.S. Pat. No. 3,344,111, issued Sept. 26, 1967; the halocarbons described in U.S. Pat. No. 3,383,356, issued May 14, 1968; the vinyl silazanes described in U.S. Pat. No. 3,453,233, issued July 1, 1969; the sulfoxide compounds described in U.S. Pat. No. 3,453,234, issued July 1, 1969; the stannous salts, the mercuric salts. the bismuth(+3) salts, the cuprous salts, and the cupric salts described in U.S. Pat. No. 3,532,649, issued Oct. 6, 1970; the polymethylvinylsiloxane cyclics discussed in U.S. Pat. No. 3,923,705; issued Dec. 2, 1975; and many others. The preferred platinum catalyst inhibitors for the compositions of this invention are the polymethylvinylsiloxane cyclics, the acetylenic compounds, and the mixture thereof. The above patents related to platinum catalyst inhibitors are hereby incorporated by reference to show the various platinum catalyst inhibitors and their use in addition cure compositions which contain silicon-bonded hydrogen atoms and silicon-bonded vinyl radicals.

The compositions of this invention can also contain other ingredients such as fillers, siloxane resins, heat stability additives, pigments, and other well known ingredients used in silicone compositions. Such additional ingredients may cause the compositions to cure to products which are not transparent, however, there are many application in which the products to not need to be transparent.

The compositions of this invention can contain amounts of (A) and (B) such that the composition will crosslink when a hydrosilation catalyst is added, either at room temperature or at an elevated temperature. The crosslinking can be such that the cured product is a soft gel, a harder gel, or a tough gel. The particular advantages of this invention are found in the gel products which can also exhibit the low temperature properties can be prepared from ingredients which are available and which do not need to be made special for each kind of cured product desired. Other advantages include the ability to vary viscosity without changing the low temperature properties. Also the temperature at which crystallization takes place can be controlled by varying the amount of vinyl in (A) and the amount of (B) and the ratio of monofunctional to difunctional methylhydrogensiloxane used. Tougher gels can be obtained because higher molecular weight polydiorganosiloxanes can be used. The hydrosilation catalyst can be present in an amount sufficient to cause the addition reaction between the siliconbonded hydrogen and the silicon-bonded vinyl radicals to take place. This amount may be very small, such as 0.1 to 40 parts by weight per one million parts by weight of the composition based on the weight of metal present. The amount of the platinum catalyst inhibitor, when used, will vary with the kind of retardation desired and the kind of inhibitor used. The various patents cited above will help direct those wishing to use a platinum catalyst inhibitor to select the correct type and amount of inhibitor. Some compositions may be slow to cure without the addition of platinum catalyst inhibitor. Such compositions may have their cure rate speeded up by increasing the platinum catalyst concentration, changing the kind of platinum catalyst and the like.

The following examples are for illustrative purposes and should not be construed as limiting the present invention which is properly delineated in the claims. The "parts" are parts by weight unless otherwise stated. The viscosities were measured at 25° C. unless otherwise specified.

EXAMPLE 1

Compositions were prepared by mixing 80 parts of a dimethylvinylsiloxy endblocked polydiorganosiloxane having 96 mol percent dimethylsiloxane units and 4 mol percent methylvinylsiloxane units (endgroups excluded in determining the mol percentages) and having a viscosity 0.000685 m²/s, 0.06 part of a platinum complex obtained by reacting chloroplatinic acid with sym-divinyltetramethyldisiloxane and having 0.85 weight percent platinum, and 0.015 part of polymethylvinyltetracyclosiloxane. This mixture was designated "base." Three crosslinking mixtures were prepared by mixing difunctional methylhydrogensiloxane of the formula

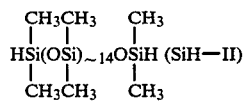

and monofunctional methylhydrogensiloxane of the formula

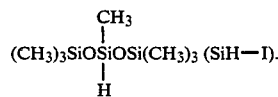

Crosslinking Mixture A:
  12.5 parts SiH-I
  12.5 parts SiH-II
  Ratio of SiH-I/SiH-II = 2.6/1
  Weight % SiH = 0.31
Crosslinking Mixture B:
  18.75 parts SiH-I
  6.25 parts SiH-II
  Ratio of SiH-I/SiH-II = 7.9/1
  Weight % SiH = 0.38
Crosslinking Mixture C:
  22.5 parts SiH-I
  2.5 parts SiH-II
  Ratio of SiH-I/SiH-II = 23.7/1
  Weight % SiH = 0.42

The crosslinking mixture was mixed with the base to provide a ratio of SiH/Si—CH=CH₂ of 1/1. The compositions were cured by heating for 15 minutes at 150° C. The crosslinking mixture and its amount used with 20 parts of base were as shown in Table I. The glass transition temperature, Tg, and the melting point, $T_m$, were measure using a Perkin Elmer differential scanning calorimeter, DSC. The penetrations were measured in 0.1 mm units using a Precision Penetrometer with a 4.5 probe attached to a 15 g plunger. The penetration of the probe into a 50 g gel sample, cured for 15 minutes at 150° C., was measured. Penetration readings were taken after five seconds. A penetration reading of 1 mm and above was considered elastomeric material or very hard gel. The control had a $T_m$ of −44° C.

TABLE I

| CROSSLINKING MIXTURE | | PENE- | |
|---|---|---|---|
| MIXTURE | AMOUNT, parts | TRATION | COMMENTS |
| A | 4.32 | 0 | very hard clear gel |
| B | 3.52 | 65 | soft clear gel, $T_m = -59°$ C. $T_g = -123°$ C. |
| C | 3.19 | liquid | did not cure |

EXAMPLE 2

Compositions were prepared as described in Example 1 with the following exceptions. The vinyl containing polydiorganosiloxane had 78 mol percent dimethylsiloxane units and 22 mol percent methylvinylsiloxane units and a viscosity of 0.01 m²/s. The base was made using 100 parts of polydiorganosiloxane, 0.075 part of the platinum complex as described in Example 1, and 0.015 part of the polymethylvinyltetracyclosiloxane. The compositions were prepared by mixing 15 parts of the base with the methylhydrogensiloxane crosslinking mixture as described below and the amount as shown in Table II.

Crosslinking Mixture D=
  94 parts SiH-I
  6 parts difunctional (SiH-III)
Crosslinking Mixture E = Same as B in Example 1
Crosslinking Mixture F = Same as C in Example 1
Difunctional SiH-III was a mixture of having the general formula

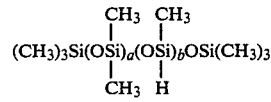

in which a was zero or a low value and b was about 2. The composition was cured and tested as described in Example 1 and the results were as shown in Table II.

TABLE II

| CROSSLINKING MIXTURE | | SiH/ | | |
|---|---|---|---|---|
| MIXTURE | AMOUNT, parts | SiCH=CH₂ | PENETRATION | COMMENTS |
| D | 8.9 | 1/1 | 0 | — |
| D | 7.1 | 0.8/1 | — | firm gel $T_m$ = none $T_g = -116°$ C. |

TABLE II-continued

| CROSSLINKING MIXTURE | SiH/ | | |
|---|---|---|---|
| MIXTURE | AMOUNT, parts | SiCH=CH$_2$ | PENETRATION | COMMENTS |
| D | 4.5 | 0.8/1 | — | firm sticky gel $T_m$ = none $T_g$ = −124° C. |
| E | 10.6 | 1/1 | 3 | — |
| F | 9.6 | 1/1 | 35 | — |

EXAMPLE 3

Compositions were prepared as described in Example 2 with the exception that the vinyl containing polydiorganosiloxane had 88 mol percent dimethylsiloxane units and 12 mol percent methylvinylsiloxane units and a vicosity of 0.000733 m$^2$/s. These compositions did not contain polymethylvinyltetracyclosiloxane. The 15 parts of base were mixed with the amount of methylhydrogensiloxane crosslinking mixture as described for D in Example 2. The amounts of crosslinking mixture are shown in Table III. The compositions did not cure after 15 minutes at 150° C. and were heated for 30 minutes at 150° C. at which point all were firm gels. The starting polydiorganosiloxane had a $T_m$ of −63° C. and a Tg of −126° C. The results of the testing for the gels were as shown in Table III.

TABLE III

| AMOUNT OF CROSSLINKING MIXTURE, parts | SiH/SiCH=CH$_2$ | COMMENTS |
|---|---|---|
| 2.77 | 0.5/1 | — |
| 4.15 | 0.75/1 | $T_m$ = none $T_g$ = −125° C. |
| 5.54 | 1/1 | $T_m$ = none $T_g$ = −121° C. |

That which is claimed is:

1. A composition which cures to a gel exhibiting low temperature properties comprising the product obtained by mixing
    (A) a polydiorganosiloxane having the general formula

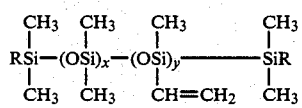

in which R is methyl or vinyl, x has a value of from 50 to 1,000 and y has a value of from 0.04(x+y) to 0.28(x+y), where x+y equals 100 mole percent.
    (B) an methylhydrogensiloxane crosslinking mixture consisting of
        (1) a monofunctional methylhydrogensiloxane selected from the group consisting of

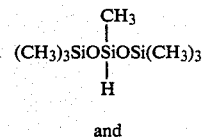

and

-continued

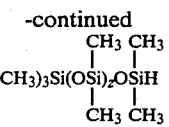

in which z has a value of from 0 to 30, and
        (2) a difunctional methylhydrogensiloxane selected from the group consisting of

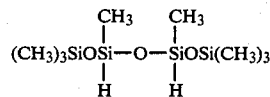

and

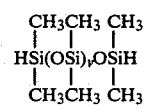

in which v has a value of from 0 to 30, and
    (C) an addition reaction catalyst.

2. The composition according to claim 1 in which the amount of monofunctional methylhydrogensiloxane (1) and difunctional methylhydrogensiloxane (2) present is such that the ratio of SiH from (1) to SiH from (2) is from 2/1 to 25/1.

3. The composition according to claim 2 in which the amount of monofunctional methylhydrogensiloxane (1) and difunctional methylhydrogensiloxane (2) present is such that the ratio of SiH from (1) to SiH from (2) is from 2.5/1 to 10/1.

4. The composition according to claim 1 in which (A) and (B) are present in amounts such that the ratio of siliconbonded hydrogen to silicon-bonded vinyl radical is from 0.4/1 to 1.5/1.

5. The composition according to claim 2 in which (A) and (B) are present in amounts such that the ratio of silicon-bonded hydrogen to silicon-bonded vinyl radical is from 0.4/1 to 1.5/1.

6. The composition according to claim 3 in which (A) and (B) are present in amounts such that the ratio of silicon-bonded hydrogen to silicon-bonded vinyl radical is from 0.4/1 to 1.5/1.

7. The composition according to claim 4 in which (A) and (B) are present in amounts such that the ratio of silicon-bonded hydrogen to silicon-bonded vinyl radical is from 0.6/1 to 1.2/1.

8. The composition according to claim 5 in which (A) and (B) are present in amounts such that the ratio of silicon-bonded hydrogen to silicon-bonded vinyl radical is from 0.6/1 to 1.2/1.

9. The composition according to claim 6 in which (A) and (B) are present in amounts such that the ratio of silicon-bonded hydrogen to silicon-bonded vinyl radical is from 0.6/1 to 1.2/1.

10. The composition according to claim 1 in which the ratio of silicon-bonded hydrogen atoms in (B) to the silicon-bonded vinyl radicals in (A) is about 1:1.

11. The composition according to claim 1 in which the addition reaction catalyst of (C) is a platinum catalyst.

12. The composition according to claim 2 in which the addition reaction catalyst of (C) is a platinum catalyst.

13. The composition according to claim 3 in which the addition reaction catalyst of (C) is a platinum catalyst.

14. The composition according to claim 4 in which the addition reaction catalyst of (C) is a platinum catalyst.

15. The composition according to claim 5 in which the addition reaction catalyst of (C) is a platinum catalyst.

16. The composition according to claim 6 in which the addition reaction catalyst of (C) is a platinum catalyst.

17. The composition according to claim 7 in which the addition reaction catalyst of (C) is a platinum catalyst.

18. The composition according to claim 8 in which the addition reaction catalyst of (C) is a platinum catalyst.

* * * * *

UNITED STATES PATENT AND TRADEMARK OFFICE
CERTIFICATE OF CORRECTION

PATENT NO. : 4,709,001

DATED : November 24, 1987

INVENTOR(S) : Myron Timothy Maxson

Page 1 of 3

It is certified that error appears in the above-identified patent and that said Letters Patent is hereby corrected as shown below:

Column 1, line 44, after "Me2SiO" remove period and replace with ---comma---.

Column 2, line 12, after "zero" remove period and replace with ---comma---.

Column 2, line 17, after "art" remove period and replace with ---comma---.

Column 2, line 19, after "However" remove period and replace with ---comma---.

Column 2, line 28, after "units" remove period and replace with ---comma---.

Column 2, line 36, after "obtained" remove period and replace with ---comma---.

Column 2, line 44, after "units" remove period and replace with ---comma---.

Column 2, line 44, after "methylsilsesquooxane units" insert a ---comma---.

Column 2, line 50, after "trimethylsiloxy" remove period and replace with ---comma---.

Column 2, line 50, after "dimethylvinylsiloxy" remove period and replace with ---comma---.

UNITED STATES PATENT AND TRADEMARK OFFICE
CERTIFICATE OF CORRECTION

PATENT NO. : 4,709,001
DATED : November 24, 1987
INVENTOR(S) : Myron Timothy Maxson It is certified that error appears in the above-identified patent and that said Letters Patent is hereby corrected as shown below:

Column 3, line 14, remove "methy" and substitute with ---methyl---.

Column 3, line 15, after "1,000" remove period and replace with ---comma---.

Column 3, line 17, remove "crosslingking" and substitute with ---crosslinking---.

Column 4, line 28, remove "Y" and substitute with ---y---.

Column 5, line 8, remove "value W of" and substitute with ---value of---.

Column 6, line 14, after "pyridazine" remove period and replace with ---comma---.

Column 6, line 26, after "salts" remove period and replace with ---comma---.

Column 9, line 21, remove "vicosity" and substitute with ---viscosity---.

UNITED STATES PATENT AND TRADEMARK OFFICE
CERTIFICATE OF CORRECTION

PATENT NO. : 4,709,001

DATED : November 24, 1987

INVENTOR(S) : Myron Timothy Maxson

It is certified that error appears in the above-identified patent and that said Letters Patent is hereby corrected as shown below:

Column 9, line 56, after "percent" remove period and replace with --- comma ---.

Signed and Sealed this

Eleventh Day of October, 1988

Attest:

DONALD J. QUIGG

*Attesting Officer*    *Commissioner of Patents and Trademarks*